US011314931B2

(12) United States Patent
Dhoolia et al.

(10) Patent No.: US 11,314,931 B2
(45) Date of Patent: Apr. 26, 2022

(54) ASSISTANT DIALOG MODEL GENERATION (71) Applicant: International Business Machines Corporation, Armonk, NY (US)

(72) Inventors: Pankaj Dhoolia, Ghaziabad (IN); Sachindra Joshi, Gurgaon (IN); Dinesh Raghu, New Delhi (IN); Robert Leslie Yates, Arlington, MA (US); Luis A. Lastras-Montano, Cortlandt Manor, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/923,286

(22) Filed: Jul. 8, 2020

(65) Prior Publication Data
US 2022/0012410 A1 Jan. 13, 2022

(51) Int. Cl.
*G06F 40/35* (2020.01)
*G06F 40/169* (2020.01)
*G06F 9/451* (2018.01)
*G06F 16/93* (2019.01)

(52) U.S. Cl.
CPC ........... *G06F 40/169* (2020.01); *G06F 9/453* (2018.02); *G06F 16/93* (2019.01)

(58) Field of Classification Search
CPC .................................................. G06F 16/3329
See application file for complete search history.

(56) References Cited

U.S. PATENT DOCUMENTS

| 10,594,757 | B1* | 3/2020 | Shevchenko | ......... H04L 65/605 |
| 2019/0132264 | A1 | 5/2019 | Jafar Ali | |
| 2019/0171758 | A1 | 6/2019 | Pinel | |
| 2019/0347319 | A1* | 11/2019 | Goyal | ..................... G10L 15/32 |
| 2020/0004878 | A1* | 1/2020 | Beaumont | ............. G06F 16/685 |

FOREIGN PATENT DOCUMENTS

WO  2019042738 A1  3/2019

OTHER PUBLICATIONS

Anonymous, "Constraint Driven Dialog: Systems & methods," An IP.com Prior Art Database Technical Disclosure, IP.com No. IPCOM000260858D, Dec. 28, 2019, 7 pages.
Mell et al., "The NIST Definition of Cloud Computing", Recommendations of the National Institute of Standards and Technology, Special Publication 800-145, Sep. 2011, 7 pages.

* cited by examiner

*Primary Examiner* — Di Xiao
(74) *Attorney, Agent, or Firm* — Nolan M. Lawrence (57) ABSTRACT

A domain-specific document is retrieved. The domain-specific document is related to the performance of a process in the domain and includes a plurality of document spans and a plurality of annotations that annotate the spans. A goal-based framework is generated from the domain-specific document. The generation is based on the plurality of annotations and based on the plurality of document spans. The goal-based framework includes entities and entity relationships related to performance of the process. The goal-based framework is transformed into a platform agnostic dialog model based on the entities and the entity relationships. At least one platform specific dialog model is provided to at least one automated response system based on the platform agnostic dialog model.

15 Claims, 6 Drawing Sheets

ASSISTANT DIALOG MODEL GENERATION

BACKGROUND

The present disclosure relates to automated assistants, and more specifically, to generating one or more frameworks from disparate source documents and transforming the frameworks into platform agnostic dialog models for a plurality of automated assistants. Automated assistants may be configured to receive queries from users and to perform responses for the queries. Automated assistants may work based on a structure of information in the format of a dialog model. A dialog model may need to be created for each type of automated assistant and may for every document that is the source of information for providing responses.

SUMMARY

According to embodiments, disclosed are a method, system, and computer program product.

A domain-specific document is retrieved. The domain-specific document is related to the performance of a process in the domain and includes a plurality of document spans and a plurality of document annotations that annotate the spans. A goal-based framework is generated from the domain-specific document. The generation is based on the plurality of annotations and based on the plurality of document spans. The goal-based framework includes entities and entity relationships related to performance of the process. The goal-based framework is transformed into a platform agnostic dialog model based on the entities and the entity relationships. At least one platform specific dialog model is provided to at least one automated response system based on the platform agnostic dialog model.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to automated assistants; more particular aspects relate to generating one or more frameworks from disparate source documents and transforming the frameworks into platform agnostic dialog models for a plurality of automated assistants. While the present disclosure is not necessarily limited to such applications, various aspects of the disclosure may be appreciated through a discussion of various examples using this context.

Automated assistants are becoming more prevalent for providing user-facing knowledge and for providing answers to specific questions of users. Automated assistants may include chatbots, conversation bots, question-answer assistants, and the like. Automated assistants may receive questions; for example, an automated assistant may be configured to receive one or more of the following: queries, inquires, requests, textual, voice, or other messages from a user. The automated assistants may be configured to parse the questions and respond with knowledge, how-to information, pertinent documents, and other information that may be meaningful to the user. For example, automated assistants may provide an answer to a question. Automated assistants may be configured to respond in a messaging, chat, or other communication style format.

Automated assistants may operate based on a specific structure of text and objects. The specific structure may be a dialog model. The dialog model includes concepts, constraints, and responses. Concepts may be a type of concept or topic that an automated assistant operates from. For example, a concept may be "making a purchase", "upgrading a service", "I have a password issue" and the like. The concept may be a domain relevant piece of information present in or inferred from a user's message or conversation context. The context might be the type of service that provides the automated assistants, such as an electronics support page, or a programming class knowledge provider website. The constraints may include various situations or states of the user, such as the user "does know the password of an email" or "does not know password of an email" may be constraints of the concept "cannot access email" of a domain of "tech support." The response may be the responsive text that an automated assistant can provide to a user, such as "ensure you have access to your phone" and "you will receive a link from your mobile device."

The dialog model has a few drawbacks. First, the dialog model may need to be hand generated. The placement of the concepts, constraints, and responses may need to be created one-by-one based on the knowledge and information of a party that has expert knowledge of the particular subject. Second, the dialog model may be a fixed object that is disconnected from the particular information and knowledge that is relevant. This may lead to issues as documentation and processes for performing certain transactions may be updated, but the dialog model of the automated assistant is not. The automated assistant may then be unable to perform question and response for technical questions; in some situations, an automated assistant may operate in a compromised matter to provide outdated and/or inaccurate information.

Third, the structure of the dialog model may be platform specific. For example, a dialog model may expect a first format for a first automated assistant. The first format of the dialog model may include wrapping certain names, values, and/or expressions inside of a markup language document and having the document embedded into a container file. A second automated assistant may, however, operate only based on a second format for a dialog model. The second specific format may expect a plain-text series of strings separated by page breaks and other specific format peculiarities. While dialog models may be in a concept, constraint, and/or response format, most documents are structured in a domain, goal, and/or constraint response format. For example, a tech-support document may be a goal driven document with a parent-goal of "how to change your password" that is incompatible with dialog models.

Annotated document platform agnostic dialog model generation (AADG) may provide enhanced practical functionality benefits over other dialog models and dialog model generation techniques. AADG may operate by creating a platform agnostic dialog model. The platform agnostic model of the AADG may be in an intermediate form that is readily configurable into one or more platform specific dialog models. The AADG may also provide benefits in the type of documents that may be used to create the dialog model. Specifically, an AADG may operate based on annotated documents, where the annotated documents are versions of the documents that extract various entities and entity relationships from the documents. For example, documents may be created to perform one or more transactions and may be domain-specific, such as filling out a government form, or performing a technical procedure. The AADG may ingest an annotated version of the document and transform the annotated document into the platform agnostic dialog model for various automated assistants. In some embodiments, the AADG may operate by identifying one or more document spans within a document and annotating the document spans to create an annotated version of the document that identifies and preserves the entities and entity relationships.

The AADG may generate a goal-based framework from the annotated version of the document. The goal-based framework may be a plurality of extracted goal-frames that include information in the format of goals, constraints, and responses. The AADG may operate to transform the goal-based framework into the platform agnostic dialog model. The platform agnostic dialog model may not include the goals and may be created or derived by performing an analysis of the entities and entity relationships preserved in the goal-based framework.

The AADG may operate by performing one or more natural language processing (NLP) techniques to identify one or more entities within a document or a document span, and to perform the annotation of the document. The AADG may also perform one or more NLP techniques to identify patterns or commonalities within a document or document span. The document may be annotated into entities—such as, a goal, constraint, or response. The AADG may leverage the entities to determine entity relationships for the goal-based framework. For example, a first goal may be a parent and a second goal may be a child. The operations of annotation may identify that a goal is an optional child goal or that a goal is a required child goal, such as a sequence of steps or one or more prerequisites for achievement of a goal.

In some embodiments, a natural language processing system may include various components (not depicted) operation through hardware, software, or in some combination. For example, a natural language processor, one or more data sources, a search application, and a report analyzer. The natural language processor may be a computer module that analyses the received content and other information. The natural language processor may perform various methods and techniques for analyzing textual information (e.g., syntactic analysis, semantic analysis, etc.). The natural language processor may be configured to recognize and analyze any number of natural languages. In some embodiments, the natural language processor may parse passages of documents or content from the AADG. Various components (not depicted) of the natural language processor may include, but are not limited to, a tokenizer, a part-of-speech (POS) tagger, a semantic relationship identifier, and a syntactic relationship identifier. The natural language process may include a support vector machine (SVM) generator to process the content of topics found within a corpus and classify the topics.

In some embodiments, the tokenizer may be a computer module that performs lexical analyses. The tokenizer may convert a sequence of characters into a sequence of tokens. A token may be a string of characters included in an electronic document and categorized as a meaningful symbol. Further, in some embodiments, the tokenizer may identify word boundaries in an electronic document and break any text passages within the document into their component text elements, such as words, multiword tokens, numbers, and punctuation marks. In some embodiments, the tokenizer may receive a string of characters, identify the lexemes in the string, and categorize them into tokens.

Consistent with various embodiments, the POS tagger may be a computer module that marks up a word in passages to correspond to a particular part of speech. The POS tagger may read a passage or other text in natural language and assign a part of speech to each word or other token. The POS tagger may determine the part of speech to which a word (or other text element) corresponds based on the definition of the word and the context of the word. The context of a word may be based on its relationship with adjacent and related words in a phrase, sentence, or paragraph.

In some embodiments, the context of a word may be dependent on one or more previously analyzed electronic documents. Examples of parts of speech that may be assigned to words include, but are not limited to, nouns, verbs, adjectives, adverbs, and the like. Examples of other part of speech categories that POS tagger may assign include, but are not limited to, comparative or superlative adverbs, wh-adverbs, conjunctions, determiners, negative particles, possessive markers, prepositions, wh-pronouns, and the like. In some embodiments, the POS tagger may tag or otherwise annotate tokens of a passage with part of speech categories. In some embodiments, the POS tagger may tag tokens or words of a passage to be parsed by the natural language processing system.

In some embodiments, the semantic relationship identifier may be a computer module that may be configured to identify semantic relationships of recognized text elements (e.g., words, phrases) in documents. In some embodiments, the semantic relationship identifier may determine functional dependencies between entities and other semantic relationships.

Consistent with various embodiments, the syntactic relationship identifier may be a computer module that may be configured to identify syntactic relationships in a passage composed of tokens. The syntactic relationship identifier may determine the grammatical structure of sentences, such as, for example, which groups of words are associated as phrases and which word is the subject or object of a verb. The syntactic relationship identifier may conform to formal grammar.

In some embodiments, the natural language processor may be a computer module that may parse a document and generate corresponding data structures for one or more portions of the document. For example, in response to receiving a document at the natural language processing system, the natural language processor may output parsed text elements from the post as data structures. In some embodiments, a parsed text element may be represented in the form of a parse tree or other graph structure. To generate the parsed text element, the natural language processor may trigger computer modules including the tokenizer, the part-of-speech (POS) tagger, the SVM generator, the semantic relationship identifier, and the syntactic relationship identifier.

In some embodiments, AADG may execute machine learning on data using one or more of the following example techniques: K-nearest neighbor (KNN), learning vector quantization (LVQ), self-organizing map (SOM), logistic regression, ordinary least squares regression (OLSR), linear regression, stepwise regression, multivariate adaptive regression spline (MARS), ridge regression, least absolute shrinkage and selection operator (LASSO), elastic net, least-angle regression (LARS), probabilistic classifier, naïve Bayes classifier, binary classifier, linear classifier, hierarchical classifier, canonical correlation analysis (CCA), factor analysis, independent component analysis (ICA), linear discriminant analysis (LDA), multidimensional scaling (MDS), non-negative metric factorization (NMF), partial least squares regression (PLSR), principal component analysis (PCA), principal component regression (PCR), Sammon mapping, t-distributed stochastic neighbor embedding (t-SNE), bootstrap aggregating, ensemble averaging, gradient boosted decision tree (GBRT), gradient boosting machine (GBM), inductive bias algorithms, Q-learning, state-action-reward-state-action (SARSA), temporal difference (TD) learning, apriori algorithms, equivalence class transformation (ECLAT) algorithms, Gaussian process regression, gene expression programming, group method of data handling (GMDH), inductive logic programming, instance-based learning, logistic model trees, information fuzzy networks (IFN), hidden Markov models, Gaussian naïve Bayes, multinomial naïve Bayes, averaged one-dependence estimators (AODE), Bayesian network (BN), classification and regression tree (CART), chi-squared automatic interaction detection (CHAID), expectation-maximization algorithm, feedforward neural networks, logic learning machine, self-organizing map, single-linkage clustering, fuzzy clustering, hierarchical clustering, Boltzmann machines, convolutional neural networks, recurrent neural networks, hierarchical temporal memory (HTM), and/or other machine learning techniques.

In some embodiments, the natural language processing system may leverage one or more of the example machine learning techniques to perform machine-learning (ML) text operations. Specifically, the AADG may operate to perform machine-learning text classification and/or a machine-learning text comparison. Machine-learning text classification may include ML text operations to convert, characters, text, words, and phrases to numerical values. The numerical values may then be input into a neural network to determine various features, characteristics, and other information of words with respect to a document or in relation to other words (e.g., to classify a numerical value associated with a word may permit the classification of a word). Machine-learning text comparison may include using the numerical values of converted characters, text, words, and phrases for performing a comparison. The comparison may be a comparison of a numerical value of a first word or other text to the numerical value of a second word or other text. The determination of the machine-learning text comparison may be to determine a scoring, a correlation, or a relevant relationship (e.g., a relationship between a first numerical value of a first word and a second numerical value of a second word). The comparison may be used to determine if two words are similar or different based on one or more criteria. The numerical operations of a machine-learning text classification/comparison may be a function of a mathematical operation performed through a neural network, such as performing a linear regression, an addition, or other relevant mathematical operation of the numerical value representative of a word or other text.

The ML text operations may include word encoding, such as one-hot encoding of words from a tokenizer, POS tagger, semantic relationship identifier, syntactic relationship identifier, and the like. The ML text operations may include the use of vectorization of text, such as the vectorization of words from a tokenizer, POS tagger, semantic relationship identifier, syntactic relationship identifier, and the like. For example, a paragraph of text may include the phrase "orange is a fruit that grows on trees." Vectorization of the word "orange" may include setting input neurons of a neural network to the various words of the phrase including the word "orange." The output value may be an array of values (e.g, forty-eight numbers, thousands of numbers). The output values may trend towards "1" for related words and may trend towards "0" for unrelated words. The related words may be related based on one or more of the following: similar parts of speech, syntactical meaning, locality within a sentence or paragraph, or other relevant "closeness" between the input and other parts of natural language (e.g., other parts of the phrase "orange is a fruit that grows on trees", other parts of a paragraph that contains the phrase, other parts of language).

Figure 1:
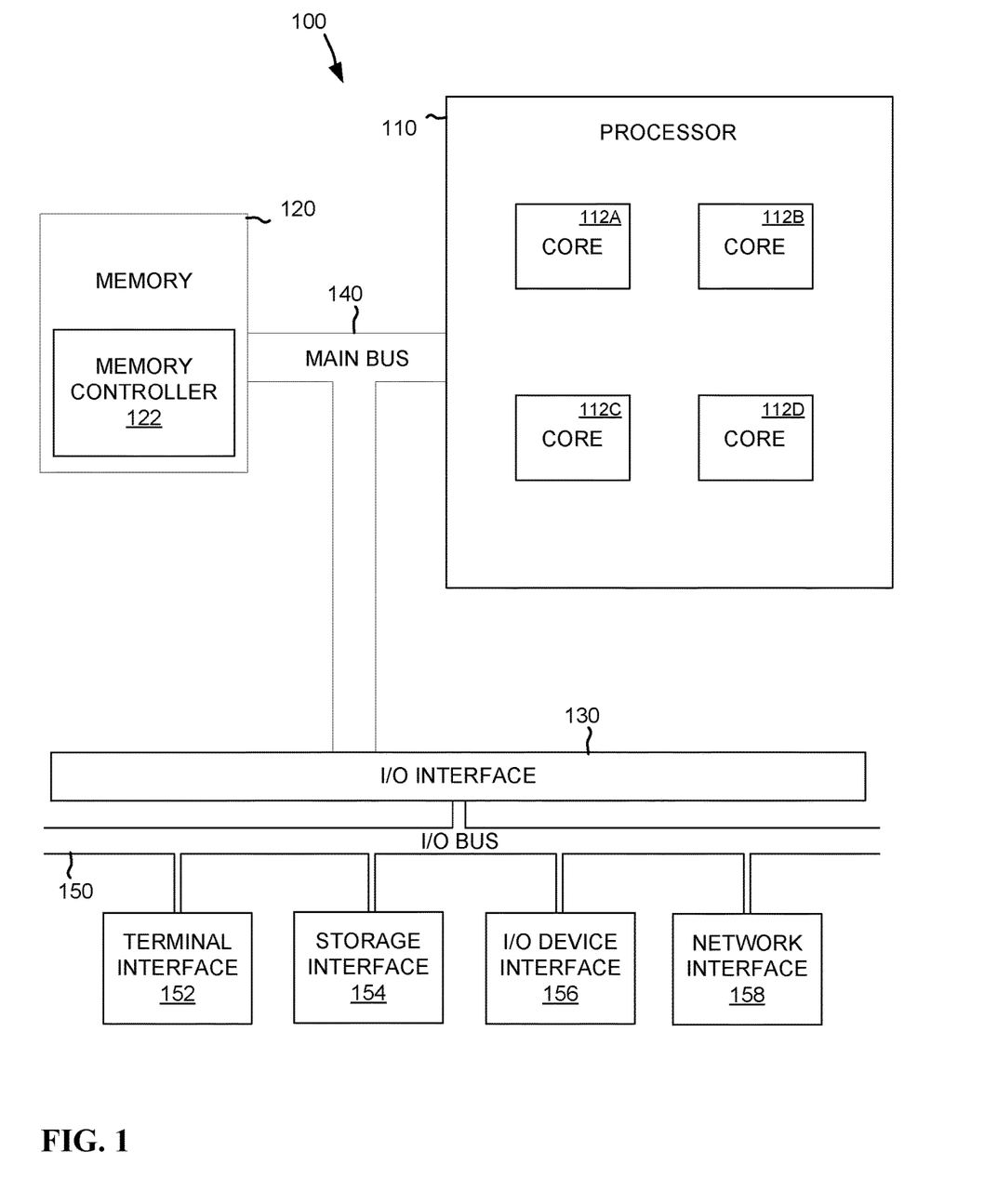
FIG. 1 depicts the representative major components of an example computer system that may be used, in accordance with some embodiments of the present disclosure.

FIG. 1 depicts the representative major components of an example computer system 100 (alternatively, computer) that may be used, in accordance with some embodiments of the present disclosure. It is appreciated that individual components may vary in complexity, number, type, and/or configuration. The particular examples disclosed are for example purposes only and are not necessarily the only such variations. The computer system 100 may comprise a processor 110, memory 120, an input/output interface (herein I/O or I/O interface) 130, and a main bus 140. The main bus 140 may provide communication pathways for the other components of the computer system 100. In some embodiments, the main bus 140 may connect to other components such as a specialized digital signal processor (not depicted).

The processor 110 of the computer system 100 may be comprised of one or more cores 112A, 112B, 112C, 112D (collectively 112). The processor 110 may additionally include one or more memory buffers or caches (not depicted) that provide temporary storage of instructions and data for the cores 112. The cores 112 may perform instructions on input provided from the caches or from the memory 120 and output the result to caches or the memory. The cores 112 may be comprised of one or more circuits configured to perform one or more methods consistent with embodiments of the present disclosure. In some embodiments, the computer system 100 may contain multiple processors 110. In some embodiments, the computer system 100 may be a single processor 110 with a singular core 112.

The memory 120 of the computer system 100 may include a memory controller 122. In some embodiments, the memory 120 may comprise a random-access semiconductor memory, storage device, or storage medium (either volatile or non-volatile) for storing data and programs. In some embodiments, the memory may be in the form of modules (e.g., dual in-line memory modules). The memory controller 122 may communicate with the processor 110, facilitating storage and retrieval of information in the memory 120. The memory controller 122 may communicate with the I/O interface 130, facilitating storage and retrieval of input or output in the memory 120.

The I/O interface 130 may comprise an I/O bus 150, a terminal interface 152, a storage interface 154, an I/O device interface 156, and a network interface 158. The I/O interface 130 may connect the main bus 140 to the I/O bus 150. The I/O interface 130 may direct instructions and data from the processor 110 and memory 120 to the various interfaces of the I/O bus 150. The I/O interface 130 may also direct instructions and data from the various interfaces of the I/O bus 150 to the processor 110 and memory 120. The various interfaces may include the terminal interface 152, the storage interface 154, the I/O device interface 156, and the network interface 158. In some embodiments, the various interfaces may include a subset of the aforementioned interfaces (e.g., an embedded computer system in an industrial application may not include the terminal interface 152 and the storage interface 154).

Logic modules throughout the computer system 100—including but not limited to the memory 120, the processor 110, and the I/O interface 130—may communicate failures and changes to one or more components to a hypervisor or operating system (not depicted). The hypervisor or the operating system may allocate the various resources available in the computer system 100 and track the location of data in memory 120 and of processes assigned to various cores 112. In embodiments that combine or rearrange elements, aspects and capabilities of the logic modules may be combined or redistributed. These variations would be apparent to one skilled in the art.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed. Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 2:
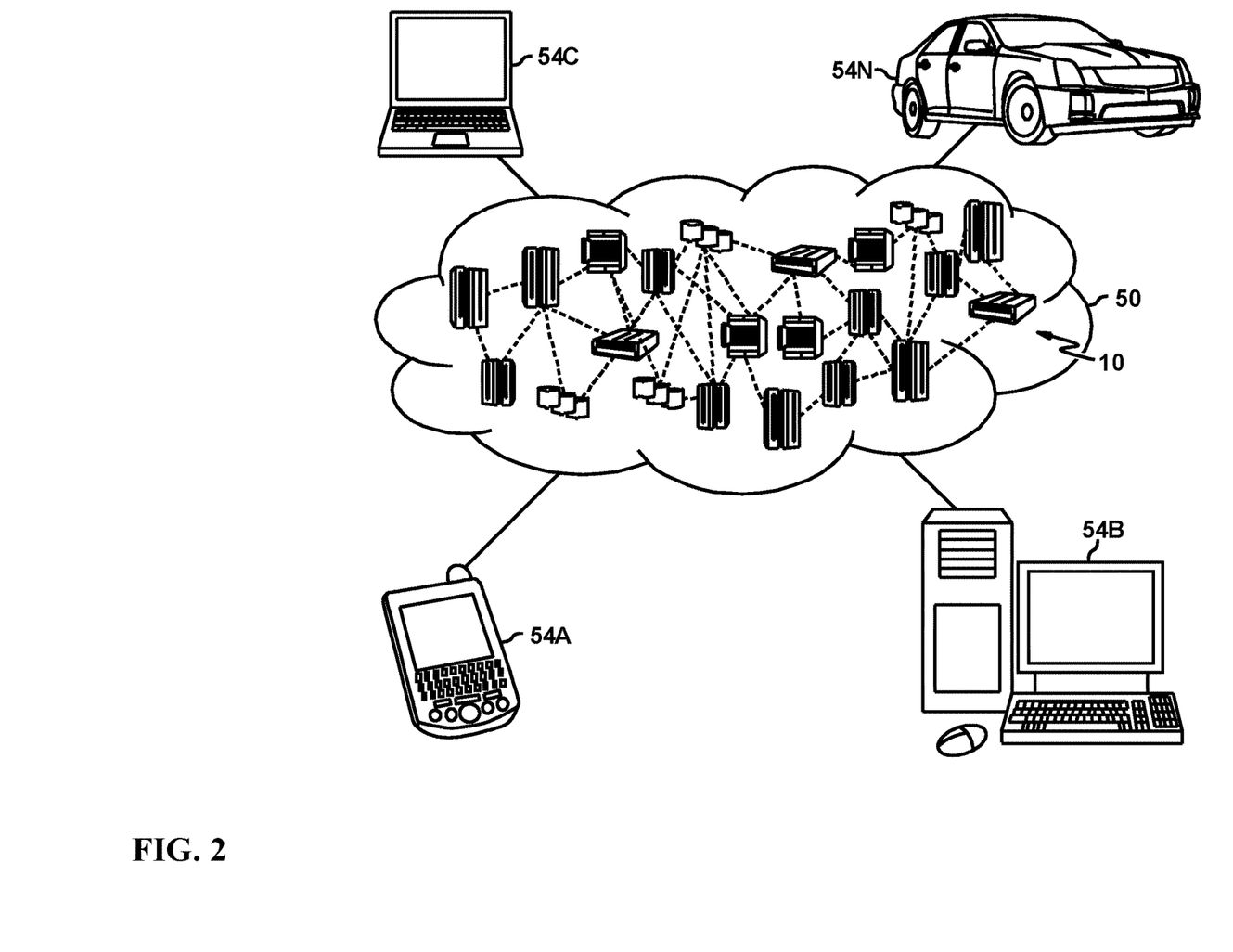
FIG. 2 depicts a cloud computing environment according to some embodiments of the present disclosure.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
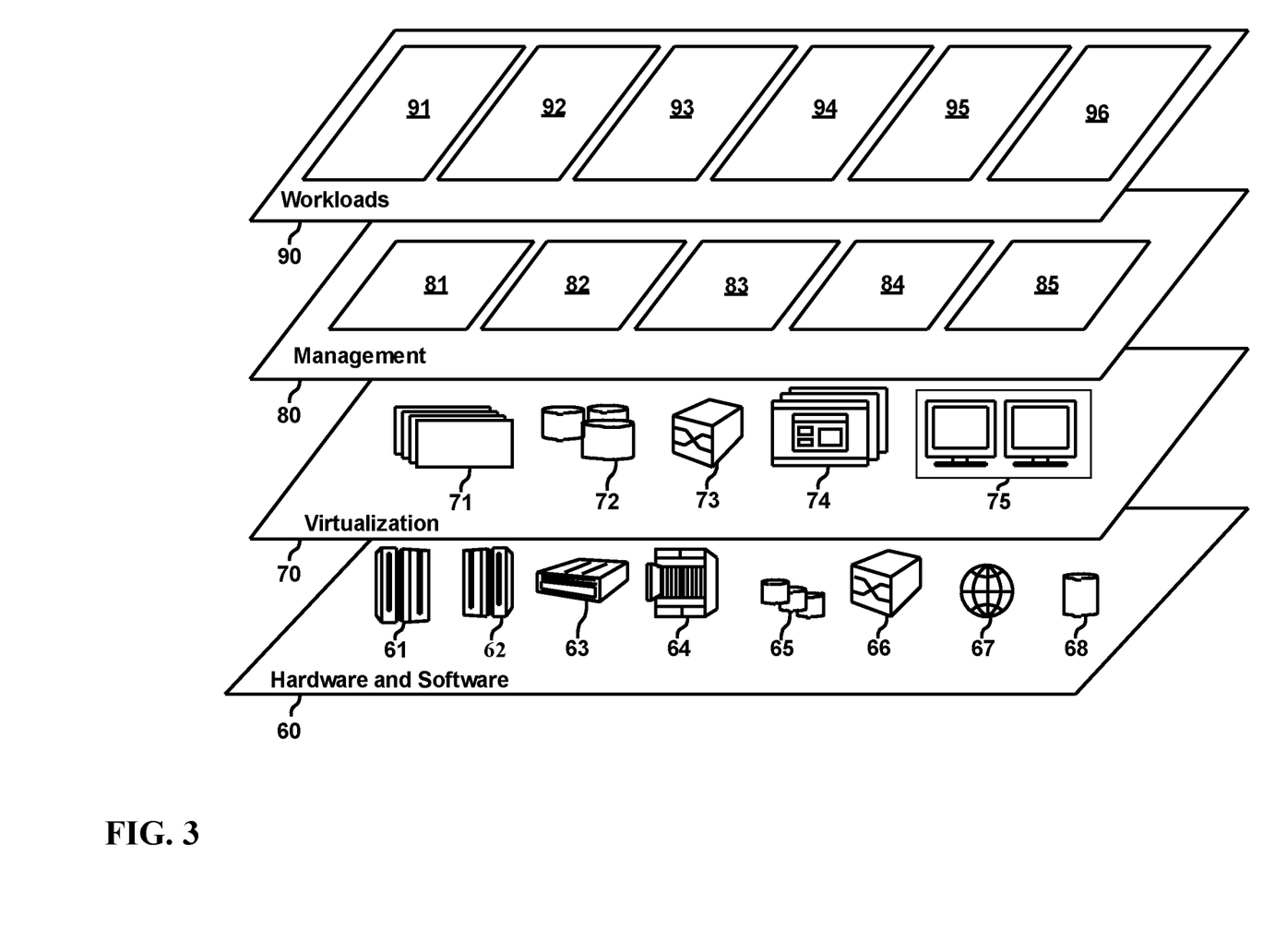
FIG. 3 depicts abstraction model layers according to some embodiments of the present disclosure.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68. Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and AADG 96.

Figure 4:
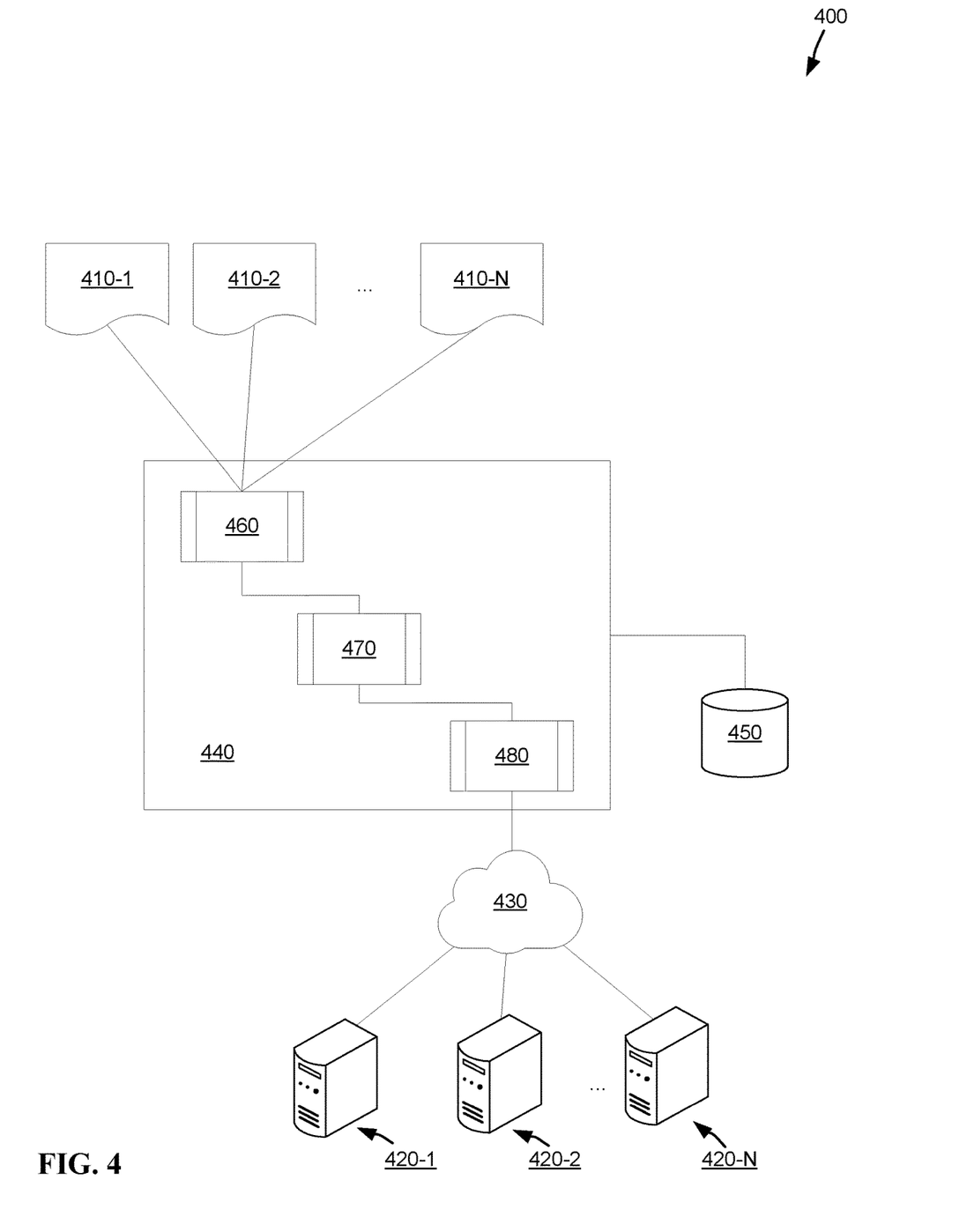
FIG. 4 depicts a system for performing generation of a platform-specific dialog model, consistent with some embodiments of the disclosure.

FIG. 4 depicts a system 400 for performing generation of a platform-specific dialog model, consistent with some embodiments of the disclosure. The system 400 may operate on a plurality of documents 410-1, 410-2, through 410-N (collectively, 410). The documents 410 may be directed to one or more specific transactions and may be in a human readable format. For example, document 410-1 may be a technical document including titles, section headings, paragraphs, numbered and non-numbered paragraphs, and other document spans in a human readable format. In another example, document 410-2 may be a how-to guide including sections, paragraphs, and other document spans. The documents may be in an unannotated format.

The system may include the following: the plurality of documents 410, one or more automated assistants 420-1, 420-2, through 420-N (collectively, 420), a network 430 for facilitating communication, an AADG 440, and a datastore 450. The network 430 may be one or more communication pathways for facilitating transfer of information between the automated assistants 420 and the AADG 440. The AADG 440 may be configured to provide platform specific dialog models to one or more automated assistants 420. Each of the automated assistants 420 may operate in accordance with a format of dialog model, such as a markup language.

The AADG 440 may retrieve a set of annotation operations and one or more predetermined rules for transforming a human-readable document into a platform specific dialog model. The AADG 440 may include one or more components. The components may include processing logic that comprises hardware (e.g., circuitry, dedicated logic, programmable logic, microcode, etc.), software (e.g., instructions run on a processor), firmware, or a combination thereof. The components may include: an annotation component 460, a model extraction component 470, and a model transformation component 480.

The annotation component 460 of the AADG 440 may be configured to annotate a given document 410 by retrieving from the datastore 450 a set of annotation operations. The annotation operations may be to perform NLP on the given document 410 to identify one or more document spans within the document. The annotation operations of the annotation component 460 may further include identifying, based on the NLP, each document span as a goal, a constraint, or as a response. In some circumstances, a document span may be related to another document span (such as being a child, detail, relation, or subordinate of another document span). The annotation component 460 may leverage NLP to determine that there is a related document span, and may annotate the given document 410 with related document span. For example, document 410-2 may be directed towards "password troubleshooting a computer system account." The annotation component 460 may determine by NLP that a first goal of document 410-2 may be to "update the password of an account" and may identify and annotate a second goal of "change your password" in document 410-2. The annotation component 460 may determine, from document 410-2, that a third goal of "know your password" may be a related goal to "change your password." The annotation component 460 may distinguish between and annotate a document with sub-goals that are optional or that are required. For example, a first goal may be a step in a sequence-of-steps.

The model extraction component 470 of the AADG 440 may be configured to generate a goal-based framework from the document. The model extraction component 470 may be configured to perform goal-based framework generation based on one or more framework generation operations. The document framework generation operations may be stored in the datastore 450. The operations may include a first operation of processing annotations in a predefined order. The predefined order of the first operation may be an occurrence order. The occurrence order may be configured based on a human-ordered format of processing language. For example, the occurrence order may be determined for a given document 410 based on performing NLP to determine the human-ordered format of the given document 410 is left-to-right and top-top-bottom. The second operation may be a goal, constraint, and/or response association operation. The second operation may be performed by the model extraction component 470, by processing an annotation and generating three elements for the goal-frame: 1) goal text for the goal, 2) a constraint and associated constraint text for the goal, and 3) a response and associated response text for the goal. The third operation may be a concatenation operation. The third operation may be performed by the model extraction component 470, by performing a concatenation operation if multiple responses (e.g., found contiguously by NLP) to create a single response from multiple responses identified in a document span. The fourth operation may be a relationship creation operation. The fourth operation may be performed by the model extraction component 470, by use of a stack. For example, using a stack along with the content structure of a given document 410 to establish a parent-child relationship within one or more goals.

The model transformation component 480 of the AADG 440 may be configured to provide platform specific dialog models to the automated response systems 420. The model transformation component 480 may be configured to operate based on one or more predefined rules. The predefined rules may be stored in the datastore 450. The platform specific dialog model may be provided by the model transformation component 480 in a two part-operation. Specifically, during a first part, one or more predefined rules may be applied to the goal-based framework received from the model extraction component 470. The goal-based framework may be in a goal, constraint, or response format, and during the first part, the model transformation component 480 may perform one or more analysis techniques to identify concepts, constraints, and responses from the goal-frames of the goal-based framework. For example, the model transformation component 480 may perform ML text operations including machine-learning text classification and machine-learning text comparison to generate a platform agnostic dialog model. The platform agnostic dialog model may be in the concept, constraint, or response format, but may not be platform dependent. During a second part, the model transformation component 480 may be configured to identify the type of automated response system. For example, automated assistant 420-2 may be configured to receive a first format of a dialog model, and automated assistant 420-1 may be configured to receive a second format of the same dialog model. The model transformation component 480 may identify the first format and the second format of the automated assistants 420-2 and 420-1, respectively. The model transformation component 480 may use a relevant technique for converting the platform agnostic dialog model into a first platform dialog model and a second platform dialog model, respectively. The relevant conversion technique may include text formatting, compiling, unit conversion, and the like.

Figure 5:
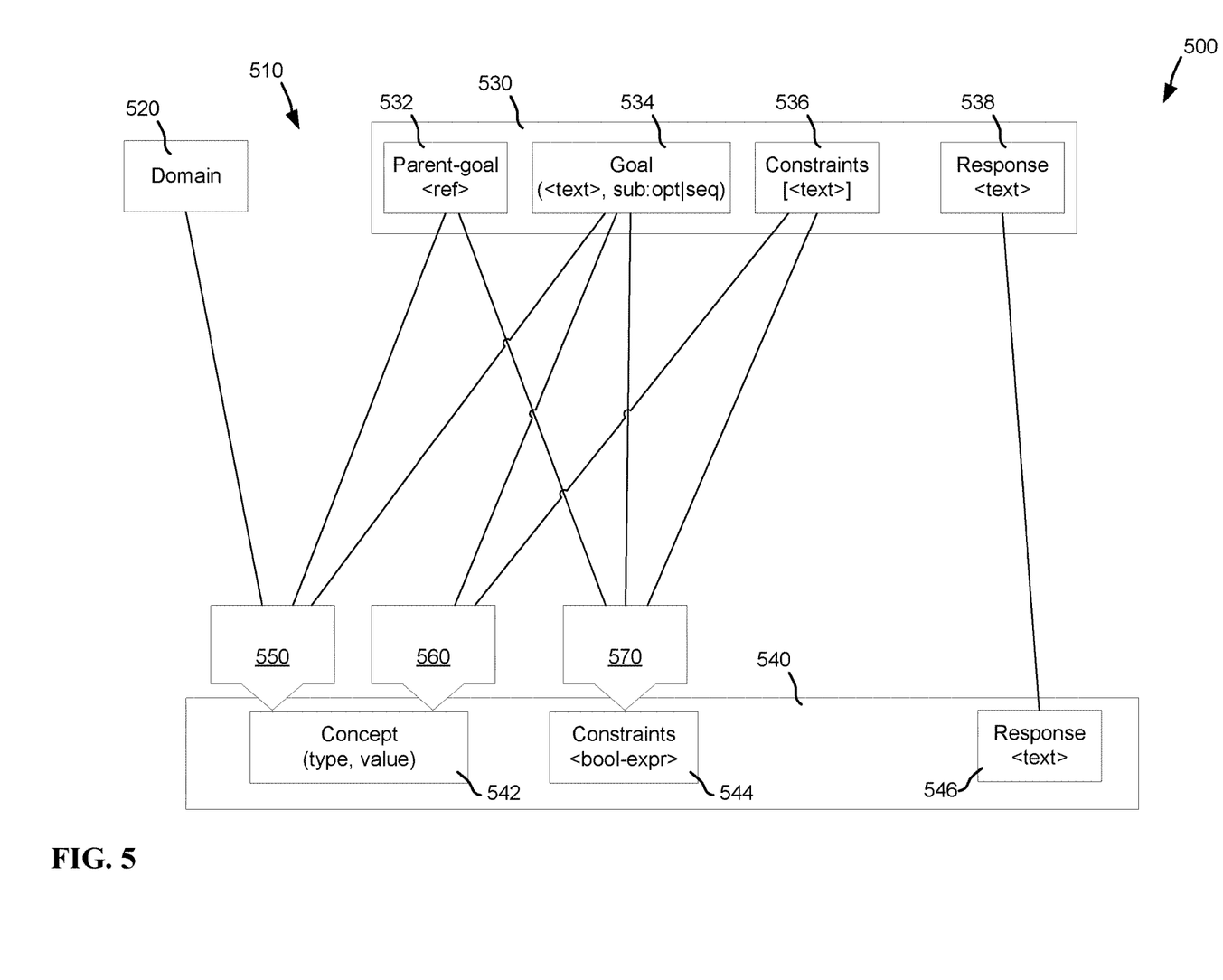
FIG. 5 depicts a model for performing transformation of a goal-based framework into a platform agnostic dialog model, consistent with some embodiments of the disclosure.

FIG. 5 depicts a model 500 for performing transformation of a goal-based framework 510 into a platform agnostic dialog model 540, consistent with some embodiments of the disclosure. The model 500 may be performed by an AADG, such as AADG 440. The goal-based framework 510 may be received from a model extraction component, such as model extraction component 470. In some embodiments, the goal-based framework 510 may have been previously extracted, and may be retrieved from a datastore, such as a storage device or a database entry or entries.

The goal-based framework 510 may include the following: a domain 520 and at least one goal-frame 530. The domain 520 and the at least one goal frame 530 may be extracted from an annotated document. The domain 520 may be a category that categories the document. The domain 520 may be derived by a user, such as an administrator that categories the document before it is annotated. The domain 520 may be derived by performing NLP or machine learning on the document to identify the domain. For example, the domain 520 of a document that includes instructions for computer passwords may be located at a uniform resource location (URL) "C:\howto\computer-guides\" and through tokenization, the domain may be identified as "computer howto."

A given goal-frame 530 may include one or more entities including the following: a parent goal 532, a goal 534, one or more constraints 536, and one or more responses 538. The entities may be attributes, values, or other relevant values or multi-value structures (e.g., key-value pairs). The parent goal 532 may be an optional entity. The parent goal 532 may refer to another goal-frame that is a parent or otherwise related to the given goal-frame 530. The <ref> text may be a pointer or other reference to the other goal-frame. The goal 534 may include a text attribute, and a relationship attribute. The text attribute may include the actual text of a goal, such as "Reset your password" for a computer password. The relationship attribute may indicate an optional or sequential sub goal or relationship with other goals. For example, a given goal-frame 530 may have a goal 534 with text of "how to log into your account" and a relationship attribute of optional "user has passphrase." The constraints 536 may include one or more constraints that may need to be performed to achieve a goal. For example, given a goal 534 of "how to reset your password", the constraints 536 may include "1) user needs the account name", and "2) User needs access to a smartphone in the user's possession."

A platform agnostic dialog model 540 may include one or more entities including the following: a concept 542, one or more constraints 544, and one or more responses 546. The concept 542 may be a type of question or rephrasing of a question that an automated assistant might receive, such as "How to successfully parallel park an automobile." The concept 542 may include a type attribute and a value attribute. The type attribute of a given concept 542 may describe, categorize, label, or otherwise relate to the value attribute. The constraints 544 may include a Boolean expression that describes one or more necessary or sufficient constraints that must be perform for a successful performance of the concept. For example, for a given concept 542 of "How do I obtain a passport" the related constraints 544 may include "a proper photo identification" that has "TRUE" as the value. The response 546 may include text that describes a solution that may be provided to a user by an automated assistant. For example, a given concept 542 of "How do I obtain a passport?" may include a related response 546 "1) Travel to a designated office", "2) Fill out the Passport Application Form 127", "3) Show the Form 127 to a passport Clerk at the designated office", and 4) Pay the appropriate fee." The platform agnostic dialog model 540 may not include goals and may not include domains. The responses 538 of the goal-based framework 510 may be copied over to the responses 546 of the platform agnostic dialog model 540.

The transformation of the goal-based framework 510 to the platform agnostic dialog model 540 may be based on a plurality of predefined rules, including a first rule 550, a second rule 560, and a third rule 570. The first rule 550 may be the creation of concepts from goals. The first rule 550 may be a multipart framework transformation rule. In more detail, the first rule 550 may include the following partial rules. If a given goal 534 has a parent goal 532, then the type of a given concept 542 derives from the parent goal 532, and the value of the given concept 542 derives from the given goal 534. If a given goal 534 does not have a parent goal 532, then the type of a given concept 542 derives from the domain 520, and the value of the given concept 542 derives from the given goal 534.

The second rule 560 may be the creation of concepts from constraints. The second rule 560 may be a multipart framework transformation rule. In more detail, the second rule 560 may include the following partial rules. If a given goal 534 has a similar parent goal 532, create a set. The created set may include all related constraints 536. For example, if a given goal-based framework 510 has a given parent goal 532 of "reset a password", then constraints 536 of the given goal-based framework 510 may be added to the set of other goal-frames that have a parent of "reset a password." After creation of the set, perform NLP to label clusters of text in the set of constraints. The labeling may be performed using a high similarity cut-off. For clusters with more than a single constraint perform ML text operations to create a concept 542. Specifically, the type of a given concept 542 may be derived by performing a vectorization and by associating words that are related inside of the set of constraints. The value for the concept 542 may then be all of the text attributes of the constraints of the set of constraints (e.g., a collection of attributes from a plurality of constraints that are in the set). For clusters with a single constraint, the type and the value of the concept may be carried over from the text of the constraint.

The third rule 570 may be the creation of constraints from the concept from a given parent goal 532, a given goal 534, and a given constraint 536. The third rule 570 may be based on the first rule 550 and the second rule 560. The expression of the constraints may be created for a goal node by performing a conjunction operation (e.g., a "&&" operation of the output of the first rule 550 and the second rule 560). A Boolean conjunction function may be performed on the following: 1) the computed constraint for the parent goal, 2) the assert condition of when the type is equal to the value for the concept generated from the first rule 550, and 3) the assert condition of when the type is equal to the value for the concept generated from the second rule 560.

Table 1 provides an example of goal-frames of an example framework 510. The example domain 520 has a value of "support-activity" in the framework 510 of Table 1.

TABLE 1

| parent goal 532 | goal 534 | constraints 536 | response 538 |
|---|---|---|---|
| None | Change your passphrase | you know your passphrase | 1. Choose System . . . |
| None | Reset your passphrase | do not know your passphrase | Try these basic solutions . . . |
| Reset your passphrase | using your primary ID | | In some software versions, . . . |
| Reset your passphrase | using another ID | you know name and passphrase of another account | In some software versions, . . . |
| Reset your passphrase | using reset passphrase assistant | encryption is enabled | Pause for at least a minute at the login . . . |
| Reset your passphrase | using your recovery key | encryption is turned on && you have an encryption recovery key | In some software versions, . . . |

Table 2 provides an example of generated concepts 542. The generated concepts 542 are a result of the first rule 550.

TABLE 2

| Type | Value |
|---|---|
| @support-activity | change-your-passphrase |
| @support-activity | reset-your-passphrase |
| @reset-passphrase-strategy | using-your-primary-ID |
| @reset-passphrase-strategy | using-another-ID |
| @reset-passphrase-strategy | using-reset-passphrase-assistant |
| @reset-passphrase-strategy | using-your-recovery-key |

Table 3 provides an example of generated concepts 542. The concepts 542 are a result of the second rule 560. For example, for the goals that do not have a parent, create a set of associated constraints (e.g., you know your passphrase, do not know your passphrase). For each created set, discover and label the clusters using ML text operations. For example, performing a machine-learning text comparison yields a similarity of "know" and "passphrase" and identifies and generates, based on NLP, "@know-passphrase" as the type for the generated concept.

TABLE 3

| Type | Value |
|---|---|
| @know-passphrase | you know your passphrase |
| @know-passphrase | do not know your passphrase |
| @you-know-name-and-passphrase-of-another-account | you know name and passphrase of another account |
| @encryption-is-enabled | encryption is enabled |
| @you-have-an-encryption-recovery-key | you have an encryption recovery key |

Table 4 provides an example of generated constraints 544. The constraints 544 are a result of the third rule 570—for example, create constraints expression by Boolean conjunction.

TABLE 4

| Constraint | <bool-expr> |
| --- | --- |
| Change your passphrase | @support-activity = = change-your-passphrase AND @know-passphrase = = you-know-your-passphrase |
| Reset your passphrase | @support-activity = = reset-your-passphrase AND @know-passphrase = = do-not-know-your-passphrase |
| Reset your passphrase >> using your primary ID | @support-activity = = reset-your-passphrase AND @know-passphrase = = do-not-know-your-passphrase AND @reset-passphrase-strategy = = using-your-primary-ID |
| Reset your passphrase >> using another ID | @support-activity = = reset-your-passphrase AND @know-passphrase = = do-not-know-your-password AND @reset-passphrase-strategy == using-another-ID AND @you-know-name-and-password-of-another-account != None |
| Reset your passphrase >> using reset password assistant | @support-activity = = reset-your-passphrase AND @know-passphrase = = do-not-know-your-passphrase AND @reset-passphrase-strategy = = using-reset-passphrase-assistant AND @encryption-is-enabled != None |
| Reset your passphrase >> using your recovery key | @support-activity = = reset-your-passphrase AND @know-passphrase = = do-not-know-your-passphrase AND @reset-passphrase-strategy = = using-your-recovery-key AND @encryption-is-enabled != None AND @you-have-an-encryption-recovery-key != None |

Figure 6:
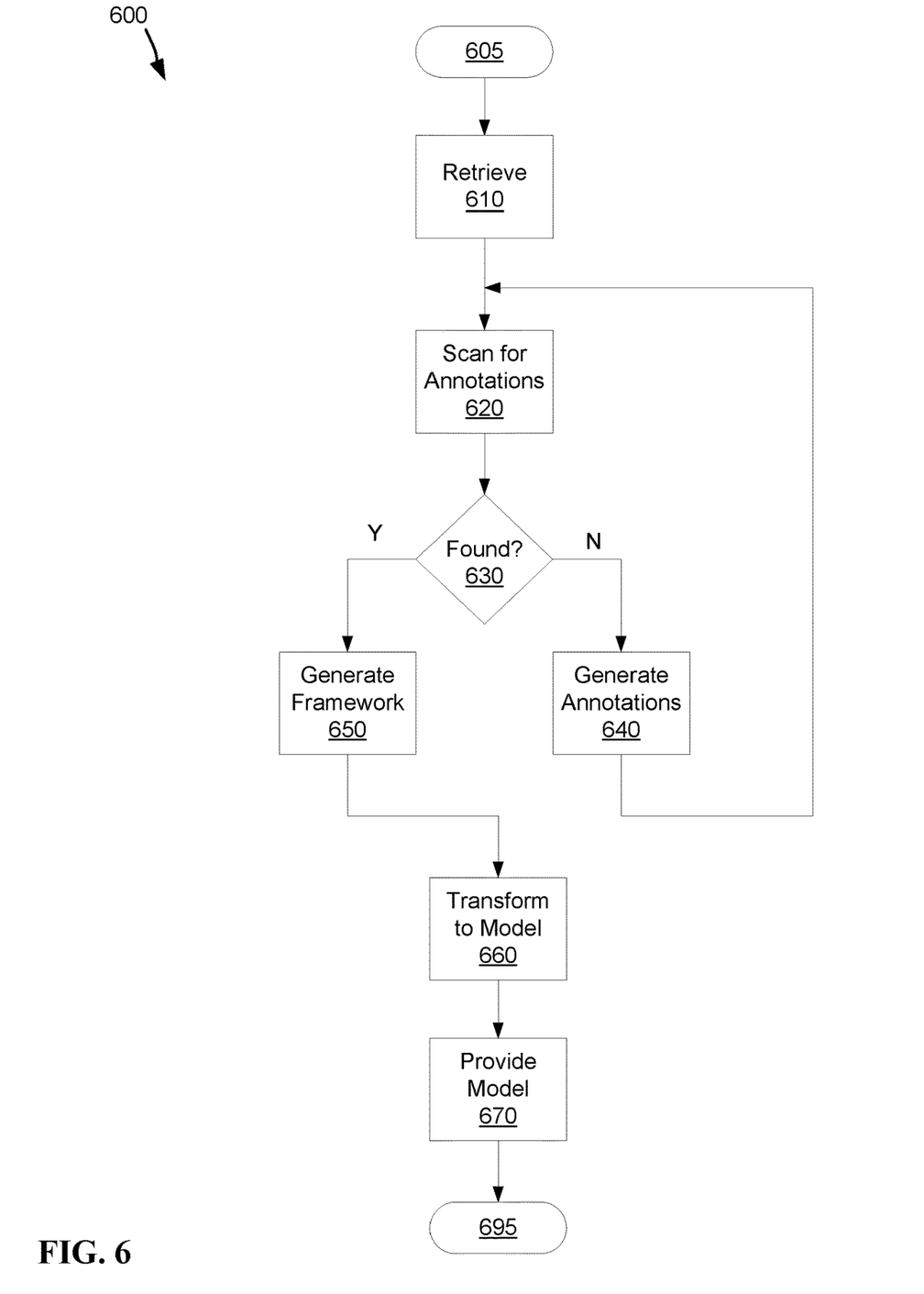
FIG. 6 depicts an example method of generating a dialog model for an automated assistant, consistent with some embodiments of the disclosure.

FIG. 6 depicts an example method 600 of generating a dialog model for an automated assistant, consistent with some embodiments of the disclosure. Method 600 may be performed by a computer system, such as computer system 100 of FIG. 1. Method 600 may be performed by an AADG, such as AADG 440. From start 605, a document may be retrieved at 610. The document may include one or more subjects, topics, information, and other relevant text. The text of the retrieved document may include one or more document spans. The document spans may be sections, regions, or other logical groupings of information.

At 620, the retrieved document may be scanned for annotations. The annotations may be scanned for by an AADG 440. For example, an annotation component 460 may operate by scanning the various document spans to detect if there are any existing annotations. In another example, a model extracting component 470 may operate by scanning the retrieved document and searching the contents of the document for the presence of any existing annotations. The scanning, at 620, may be performed using an NLP technique or techniques. If there are no annotations found, at 630:N, one or more annotations may be generated at 640. The generated annotations may be based on performing text analysis to identify one or more document spans from the retrieved document. After the annotations are generated, at 640, method 600 may continue by scanning for the annotations at 620.

At 650, if there are annotations found in the document at 630:Y, a goal-based framework may be generated. The goal-based framework may be generated by analysis of the document, and the annotations. For example, a model extraction component 470 may perform analysis of the document, NLP techniques, or some combination to generate a plurality a goal-based framework. The goal-based framework may include a plurality of goal frames that are a goal, constraint, response format for understanding the various goals, requirements, and actions that a user may take by consuming the document (e.g., by reading and understanding the document).

At 660, the goal-based framework may be transformed into a platform agnostic dialog model. For example, a model transformation component 480, may operate based on rules 550, 560, 570, to create the platform agnostic dialog model. At 670, the platform agnostic dialog model may be provided to one or more automated response systems. For example, an AADG 440 may operate by storing the platform agnostic dialog model into a long-term storage device (e.g., a disk drive, solid-state storage, a tape media). The AADG 440 may listen for requests from various automated response systems. Responsive to detecting a give automated response system, the AADG 440 may identify a format of the given automated response system and may provide a formatted version of the platform agonist dialog model (e.g., a platform specific dialog model). After the dialog model is provided to one or more automated response systems, at 670, method 600 may end at 695.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A method comprising:
   retrieving a domain-specific document, the domain-specific document being related to performance of a process in a domain, the domain-specific document including a plurality of document spans and a plurality of annotations that annotate the spans;
   generating, based on the plurality of annotations and based on the plurality of document spans, a goal-based framework from the domain-specific document, wherein the goal-based framework includes entities and entity relationships related to performance of the process;

transforming, based on the entities and entity relationships, the goal-based framework into a platform agnostic dialog model; and providing, based on the platform agnostic dialog model, at least one platform specific dialog model to at least one automated response system, wherein the automated response system is configured to operate based on concepts, constraints, and responses, and wherein the automated responses system is not configured to operate on goals.

2. The method of claim 1, wherein the providing the platform specific dialog model further comprises:

identifying a first automated response system;

determining a first format for a first platform dialog model of the first automated response system; and converting, based on the first format, the platform agnostic dialog model into the first platform dialog model.

3. The method of claim 2, wherein the providing the platform specific dialog model further comprises:

identifying a second automated response system;

determining a second format for a second platform dialog model of the second automated response system; and converting, based on the second format, the platform agnostic dialog model into the second platform dialog model.

4. The method of claim 1, wherein the transforming the goal-based framework is based on one or more predetermined rules.

5. The method of claim 4, wherein the domain-specific document is in a human readable format, and wherein one or more concepts are created from one or more goals based on the one or more predetermined rules.

6. The method of claim 1, wherein the entities and entity relationships include domains, goals, constraints, and responses.

7. A system, the system comprising:

a memory, the memory containing one or more instructions; and a processor, the processor communicatively coupled to the memory, the processor, in response to reading the one or more instructions, configured to:

retrieve a domain-specific document, the domain-specific document related to performance of a process in a domain, the domain-specific document including a plurality of annotations and a plurality of document spans;

generate, based on the plurality of annotations and based on the plurality of document spans, a goal-based framework from the domain-specific document, wherein the goal-based framework includes entities and entity relationships for performance of the process;

transform, based on the entities and entity relationships, the goal-based framework into a platform agnostic dialog model; and provide, based on the platform agnostic dialog model, at least one platform specific dialog model to at least one automated response system, wherein the automated response system is configured to operate based on concepts, constraints, and responses, and wherein the automated responses system is not configured to operate on goals.

8. The system of claim 7, wherein the providing the platform specific dialog model further comprises:

identify a first automated response system;

determine a first format for a first platform dialog model of the first automated response system; and convert, based on the first format, the platform agnostic dialog model into the first platform dialog model.

9. The system of claim 8, wherein the providing the platform specific dialog model further comprises:

identify a second automated response system;

determine a second format for a second platform dialog model of the second automated response system; and convert, based on the second format, the platform agnostic dialog model into the second platform dialog model.

10. The system of claim 7, wherein the generate the goal-based framework is based on one or more predetermined rules.

11. The system of claim 10, wherein the domain-specific document is in a human readable format, and wherein the one or more predetermined rules include generating based on text analysis one or more concepts from one or more goals.

12. A computer program product, the computer program product comprising:

one or more computer readable storage media; and program instructions collectively stored on the one or more computer readable storage media, the program instructions configured to:

retrieve a domain-specific document, the domain-specific document related to performance of a process in a domain, the domain-specific document including a plurality of annotations and a plurality of document spans that fully describe how to perform the process;

generate, based on the plurality of annotations and based on the plurality of document spans, a goal-based framework from the domain-specific document, wherein the goal-based framework includes entities and entity relationships for performance of the process;

transform, based on the entities and entity relationships, the goal-based framework into a platform agnostic dialog model; and provide, based on the platform agnostic dialog model, at least one platform specific dialog model to at least one automated response system, wherein the automated response system is configured to operate based on concepts, constraints, and responses, and wherein the automated responses system is not configured to operate on goals.

13. The computer program product of claim 12, wherein the generating the goal-based framework is based on one or more predetermined rules.

14. The computer program product of claim 13, wherein the domain-specific document is in a human readable format, and wherein the one or more predetermined rules include generating based on text analysis one or more concepts from one or more goals.

15. The computer program product of claim 12, wherein the entities and entity relationships include domains, goals, constraints, and responses.

* * * * *